(12) United States Patent
Lage

(10) Patent No.: US 11,091,245 B2
(45) Date of Patent: Aug. 17, 2021

(54) FIBRE REINFORCED COMPOSITE AEROFOIL STRUCTURES

(71) Applicant: Airbus Operations Limited, Bristol (GB)

(72) Inventor: Paulo Jorge Teixeira Lage, Bristol (GB)

(73) Assignee: Airbus Operations Limited, Bristol (GB)

( * ) Notice: Subject to any disclaimer, the term of this patent is extended or adjusted under 35 U.S.C. 154(b) by 556 days.

(21) Appl. No.: 15/956,913

(22) Filed: Apr. 19, 2018

(65) Prior Publication Data
US 2018/0304989 A1    Oct. 25, 2018

(30) Foreign Application Priority Data

Apr. 25, 2017  (GB) .................................... 1706506

(51) Int. Cl.
*B29C 70/30*    (2006.01)
*B64C 3/20*    (2006.01)
(Continued)

(52) U.S. Cl.
CPC ............... *B64C 3/20* (2013.01); *B29C 33/26* (2013.01); *B29C 53/063* (2013.01); *B29C 53/36* (2013.01);
(Continued)

(58) Field of Classification Search
CPC ....... B29C 70/30; B29C 70/42; B29C 70/462; B29C 70/345
See application file for complete search history.

(56) References Cited

U.S. PATENT DOCUMENTS 2,664,593 A * 1/1954 Larson ................. B29C 33/302
425/195
3,028,292 A * 4/1962 Hinds ................. B29D 24/008
156/214
(Continued)

FOREIGN PATENT DOCUMENTS

DE    10 2008 038620    12/2009
DK          171 948     8/1997
(Continued)

OTHER PUBLICATIONS

Combined Search and Examination Report for GB1706506.1, dated Nov. 2, 2017, 8 pages.
(Continued)

*Primary Examiner* — Matthew J Daniels
(74) *Attorney, Agent, or Firm* — Nixon & Vanderhye P.C.

(57) ABSTRACT

A composite component adapted to be formed into an aerofoil, a method of forming an aerofoil, an aerofoil, an aircraft wing and a forming jig. The method involves forming a flat layup sheet of plies (1) to be folded about a central leading edge region (6) of the layup into an aerofoil shape, applying to the flat layup (1) one or more layups of plies (9, 10) shaped as spars, partially curing the layup (1) with the spars attached, folding the resulting partially cured composite component (30) about the leading edge region (6) in a forming jig (19) so that opposing edges (4, 5) of the sheet meet as a trailing edge (36) of the aerofoil (35), clamping the jig (19) closed, and curing the composite component (30) and adhesive in the forming jig (19) to form the finished aerofoil (35).

8 Claims, 4 Drawing Sheets

(51) Int. Cl.
*B29C 70/44* (2006.01)
*F03D 1/06* (2006.01)
*B29D 99/00* (2010.01)
*B29C 53/36* (2006.01)
*B29C 33/26* (2006.01)
*B64F 5/10* (2017.01)
*B29C 53/06* (2006.01)
*B29C 70/38* (2006.01)
*B64C 9/02* (2006.01)
*B29L 31/30* (2006.01)
*B64C 1/00* (2006.01)
*B64C 9/00* (2006.01)

(52) U.S. Cl.
CPC .......... *B29C 70/384* (2013.01); *B29C 70/446* (2013.01); *B29D 99/0025* (2013.01); *B64C 9/02* (2013.01); *B64F 5/10* (2017.01); *F03D 1/0675* (2013.01); *B29L 2031/3085* (2013.01); *B64C 2001/0072* (2013.01); *B64C 2009/005* (2013.01); *Y02E 10/72* (2013.01)

(56) References Cited

U.S. PATENT DOCUMENTS

| | | | | |
|---|---|---|---|---|
| 3,097,982 | A * | 7/1963 | Stoner | B64C 3/00 156/211 |
| 3,658,612 | A * | 4/1972 | Corzine | B32B 3/18 156/93 |
| 4,639,284 | A * | 1/1987 | Mouille | B29D 99/0025 156/213 |
| 4,643,646 | A * | 2/1987 | Hahn | F03D 1/065 416/226 |
| 4,721,593 | A * | 1/1988 | Kowal | B29C 70/44 156/156 |
| 7,223,091 | B2 * | 5/2007 | Olsen | F03D 1/065 425/450.1 |
| 9,422,916 | B2 * | 8/2016 | Schibsbye | F03D 1/0675 |
| 9,951,750 | B2 * | 4/2018 | Caruso | F03D 1/0675 |
| 10,987,879 | B2 * | 4/2021 | Johnson | B29C 70/342 |
| 2010/0062238 | A1 * | 3/2010 | Doyle | B29C 70/02 428/295.1 |
| 2010/0135817 | A1 * | 6/2010 | Wirt | F03D 1/0675 416/226 |
| 2010/0135818 | A1 * | 6/2010 | Babu | F03D 1/0683 416/226 |
| 2015/0316028 | A1 | 11/2015 | Brekenfeld | |
| 2017/0114773 | A1 * | 4/2017 | Riahi | B29C 70/52 |

FOREIGN PATENT DOCUMENTS

| | | |
|---|---|---|
| GB | 2 119 303 | 11/1983 |
| NL | 8800386 | 9/1989 |
| WO | 2012/019610 | 2/2012 |
| WO | 2013/113815 | 8/2013 |
| WO | WO 2015/156857 | 10/2015 |

OTHER PUBLICATIONS

European Search Reported cited in 18161934.7 dated Oct. 18, 2018, 10 pages.

* cited by examiner

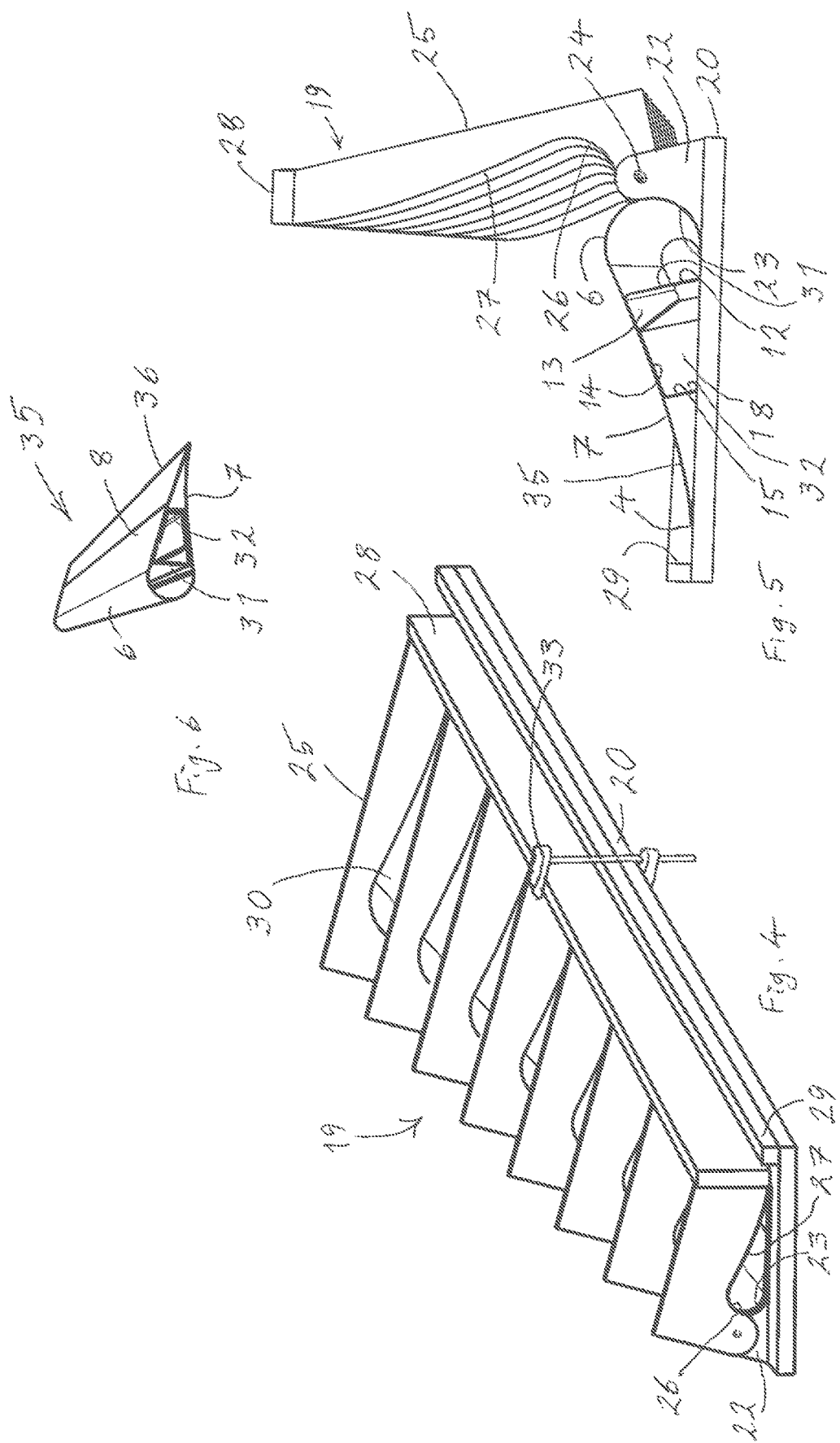

FIBRE REINFORCED COMPOSITE AEROFOIL STRUCTURES

RELATED APPLICATION

This application claims priority to United Kingdom patent application GB 1706506.1, filed Apr. 25, 2017, the entirety of which is incorporated by reference.

FIELD OF THE INVENTION

The present invention relates to fibre reinforced composite aerofoil structures and to a method and jig for manufacture of such structures. In particular, the invention relates to a composite component adapted to be formed into an aerofoil, an aerofoil, an aircraft wing, a method of forming an aerofoil and a forming jig for forming an aerofoil.

BACKGROUND TO THE INVENTION

It is well known to lay up composite aerofoil skin and box sections in precisely shaped moulds and to form those sections into full or part aerofoil sections, again, in precisely shaped moulds.

This known production method is time consuming and expensive, requiring the manufacture of expensive tooling to form the aerofoil section with the required accuracy and reproducibility.

It is an object of the invention to produce aerofoil structures of fibre reinforced composite material more efficiently or more cheaply.

SUMMARY OF THE INVENTION

According to a first aspect of the invention, there is provided a composite component for forming into an aerofoil, the component comprising a generally flat sheet of fibre reinforced plastics composite material having a length spanwise of the aerofoil and a width chordwise of the aerofoil, the sheet defining an aerodynamic surface and an opposing reverse surface thereon, the sheet being divided widthwise into a pair of surface regions, each adjoining a side edge of the sheet and a central leading edge region, and a spar formed from a further sheet of fibre reinforced plastics composite material adhered to the reverse surface of a first said surface region, wherein the sheet is shaped to be folded over such that the side edges generally co-extend with one another as a trailing edge of the aerofoil, wherein the central region is adapted upon folding to be formed into a curved said leading edge of the aerofoil, and wherein the spar is shaped whereby, upon folding, to meet the reverse surface of a second said surface region and thereby to support both surface regions of the aerofoil, in use.

The leading edge region may be thinner in cross section than at least one surface region in order to facilitate bending of the component and may have a cross sectional thickness of less than 70%, preferably less than 55% and more preferably less than 15% of one or both surface regions.

The leading edge region may include a greater proportion of reinforcing fibres orientated spanwise in the leading edge region than one or both surface regions. This feature may again facilitate bending of the component. In one example component, spanwise orientated fibres were alternated with fibres angled to the spanwise direction in approximately equal measure.

At least part of the component may be formed from 'pre-preg' material in which the plies of fibre reinforcing material are supplied already impregnated with matrix material. "Pre-preg" is a well-known term to describe one or more plies of fibre reinforcing material such as carbon fibre matting, unidirectional or multi-axis fibres pre-impregnated with plastics matrix material such as epoxy resin. Convenient for use according to the invention are unidirectional stitched plies or pre-preg non-crimp fabrics (NCFs) where plies of unwoven fabric are stitched together.

The spar may comprise a first limb attached to the reverse surface of the first surface region, a second limb shaped to extend between first and second surface regions, upon folding of the component into the aerofoil shape, and a third limb shaped to co-extend with the reverse surface of the second surface region and to be attached thereto.

A second spar may be applied to the reverse surface of a surface region of the layup, said first and second spars being positioned whereby to form front and rear spars, respectively, of the aerofoil.

According to a second aspect of the invention there is provided an aerofoil formed from a composite component according to the first aspect.

The aerofoil may be used in any desired circumstance and may for example be in the form of an aircraft wing, an aileron or other control surface for an aircraft wing, a horizontal or vertical tailplane, a helicopter rotor, a propeller, a fan blade or a wing sail. The scale of the aerofoil will depend on the application required and may be modified, for example, by the number of spars used and the form of each spar. It is envisaged, for example, that a very small aerofoil may only require one spar, whereas larger aerofoils such as wings may require three or more spars.

According to a third aspect of the invention, there is provided an aircraft wing including an aerofoil according to the second aspect.

According to a fourth aspect of the invention, there is provided a method of forming a composite component according to the first aspect of the invention, including the steps of forming a layup of plies of fibre reinforcing material to be formed into the generally flat sheet of the component, forming a further layup of plies to be formed into the spar, supporting the further layup of plies in the said shape of the spar against the reverse surface of the first surface region and curing the layups together to form the composite component.

According to a fifth aspect of the invention, there is provided a method of forming an aerofoil, including the steps of folding a composite component formed according to the method of the fourth aspect about the leading edge region until the first and second surface regions meet at their trailing edges, supporting the folded composite component in the desired shape of the aerofoil and applying heat and pressure as required to form and fully cure the composite component as a said aerofoil.

The steps of folding the composite component about the leading edge region until the first and second surface regions meet at their trailing edges and supporting the folded composite component in the desired shape of the aerofoil preferably comprise placing the composite component in a forming jig shaped to form the composite component into a said aerofoil shape and folding in the jig the composite component about the leading edge region until the first and second surface regions meet at their trailing edges.

The layups may be cured together to form a composite component in a state of partial cure. The state of partial cure is preferably between 80% and 95% of full cure and more preferably in the region of 90% cure.

The step of folding the composite component about the leading edge region may include the step of applying heat to the composite component to aid bending thereof.

The further layup of plies may be formed as a generally flat sheet before being applied to the reverse surface of a said surface region of the layup. Alternatively, the further layup of plies may be formed around a mandrel.

The further layup of plies may be formed generally into a C shape when being supported against the reverse surface of a said surface region of the layup. For the C shape and for other shapes, the further layup of plies may be supported in the shape of the spar by a mandrel inserted therein.

During the step of applying heat and pressure as required to form and fully cure the composite component as a said aerofoil, a said spar may be supported against a surface region by a mandrel.

The step of applying a further layup of plies may comprise applying two further layups of plies, positioned on the layup of plies whereby to act as forward and rear spars for the aerofoil, respectively.

According to a sixth aspect of the invention there is provided a forming jig shaped to form a composite component according to the first aspect into an aerofoil shape, the forming jig having a bed defining a surface shaped to form an aerodynamic surface on a first surface region of the composite component and a series of spanwise spaced forming arms, each arm having a shape corresponding to an aerodynamic surface to be formed on a second surface region at a given spanwise position of the said arm, the bed and the series of forming arms being pivotally linked together whereby to enable folding of the composite component into the aerofoil shape.

The series of forming arms may be rigidly linked together whereby to create a rigid former to form the aerodynamic surface on the second surface region, said rigid former being pivotally linked to the bed as aforesaid.

The bed and the forming arms may be shaped to form a symmetric or an asymmetric aerofoil shape. For example, the first surface region may be convex and the second surface region may be concave. For an aileron, the first or upper surface region may be flat and the second or lower surface region may be concave.

The forming jig may include an abutment positioned to receive a side edge of the composite component therealong whereby accurately to locate the composite component in the jig.

The invention is suitable for manufacture of both monolithic and sandwich composite structures. Manufacture of a layup for a sandwich structure may include the step of applying a sandwich core and then a second skin over the core, once the composite component has been formed to the aerofoil shape. Alternatively, the full sandwich structure may be formed as part of the layup of plies, before folding to the aerofoil shape.

BRIEF DESCRIPTION OF THE DRAWINGS

The invention will now be described, by way of example only, with reference to the following drawings in which:

FIG. 4 is a perspective view from one end of an aerofoil according to the invention being formed in a jig similar to that of FIG. 3, according to the method of the invention;

FIG. 5 is a perspective view from one end of an aerofoil formed according to the invention, before removal from the jig, and FIG. 6 is a perspective view from one end and above of an aerofoil formed according to the invention.

DETAILED DESCRIPTION OF PREFERRED EMBODIMENT

Figure 1:
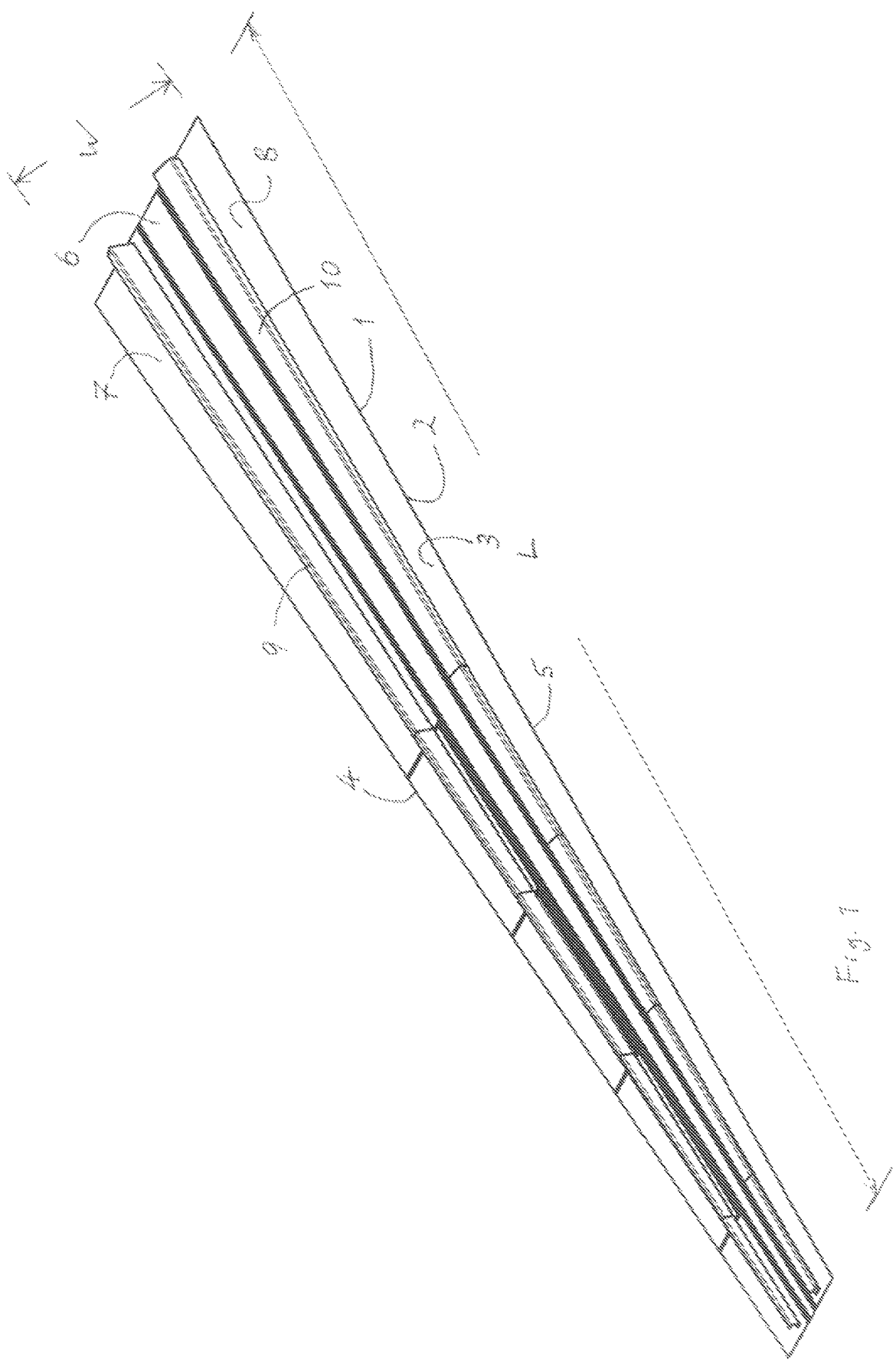
FIG. 1 is a perspective view from above of a composite component according to the invention.

FIG. 1 shows a composite component according to the invention. The component comprises a generally flat sheet 1 of carbon fibre "pre-preg" non-crimp fabric (NCF) plies (plies not separately shown). Graphene doped low temperature cure resin is used for lightning strike protection and lower moisture absorption, for the aerofoil. The component will be formed into an aileron for an aircraft wing. The sheet 1 has a length L, spanwise of the aerofoil to be constructed from the component and a width W, chordwise of the aerofoil. The sheet 1 defines an aerodynamic surface 2 and a non-aerodynamic reverse surface 3. The width W is defined by a pair of opposed side edges 4, 5 which extend spanwise of the aerofoil. The sheet 1 is divided widthwise into a central, leading edge, region 6, flanked by first and second surface regions 7, 8, each extending widthwise from the leading edge region 6 to a respective side edge 4, 5.

The leading edge region 6 has a thinner cross section of plies than the adjoining surface regions 7, 8 to facilitate greater bending of the leading edge region 6 than will be applied to the surface regions 7, 8, when forming the component into the aerofoil shape. Here the leading edge region 6 has two plies and the surface regions 7, 8 have between two and sixteen plies, according to load requirements.

Ply layup of the component may be conventional, with alternating plies, for example of 0 deg. (spanwise) and ±45 deg orientation. 90 deg plies may be used or not, according to load requirements. In particular, 90 deg plies may be omitted from the leading edge region 6, to aid bending. It will be understood that layup construction will always be a matter for the part designer, when balancing load requirements against the need to bend the leading edge region through approximately 180 degrees. NCF, if used, may be stitched in fabrics several plies thick or in thinner plies, as required.

Layup of pre-preg fabrics or stitched unidirectional plies, each being two or more plies thick having a 0 deg ply and at least one angled ply, takes place according to the method of the invention on a flat surface and may be undertaken by robot. The robot may suitably be an automated fibre placement robot or an automated tape laying robot. Consolidation and de-bulking is carried out as required, here being undertaken after layup of the first ply and thereafter every two plies or more, dependent upon the degree of consolidation required.

On the flat sheet 1 are then placed further layups of spar plies 9, 10. Each layup of spar plies 9, 10 is generally of a C shape, with each layup having been laid up flat and subsequently formed into the C shape, conveniently on an accurately formed and tapered mandrel to be used later, also, during the formation of a composite component. Alternatively, layup may take place directly on the mandrel, either manually or by robotic (automated fibre placement) means. Layup 9 has a first limb 11 to be attached either by co-curing or by co-bonding, to the first surface region 7, a second limb 12 shaped to extend between first and second surface regions 7, 8, upon folding of the layup 1 into the aerofoil shape, and a third limb 13 shaped to co-extend with the reverse surface 3 of the second surface region 8 and to be attached thereto. Layup of spar plies 10 has first, second and third limbs 14, 15, 16, respectively, with the same functions as the corresponding limbs of layup 9.

Ply orientation for the layups of spar plies 9, 10 will, again, depend on stress analysis and may be conventional or unconventional, with alternating ply fibre orientations.

Each layup of spar plies 9, 10 is maintained in shape, on layup 1, by a tapered and accurately formed mandrel 17, 18, respectively. The mandrel may be formed in one piece or, for a long workpiece, may be made in sections with the sections optionally being adhered together, in use. The adhesive used may be made deliberately weak to enable breakup of a long mandrel, for easy transport and storage. Mandrels used in sections may also enable easier removal from the composite component, when cured or part cured. The combined layup 1, 9, 10, still on the original flat layup surface, is then bagged and co-cured, in an oven or in an autoclave if required, to form a composite component 30 at approximately 90% full cure, having front and rear spars 31, 32 co-cured in position thereon (see FIG. 4).

Thus, the method of the invention allows rapid layup on a flat surface of both the sheet 1 and the layups of spar plies 9, 10, together with co-curing of the layups together to form a composite component ready for forming to final aerofoil shape as an aileron.

Figure 3:
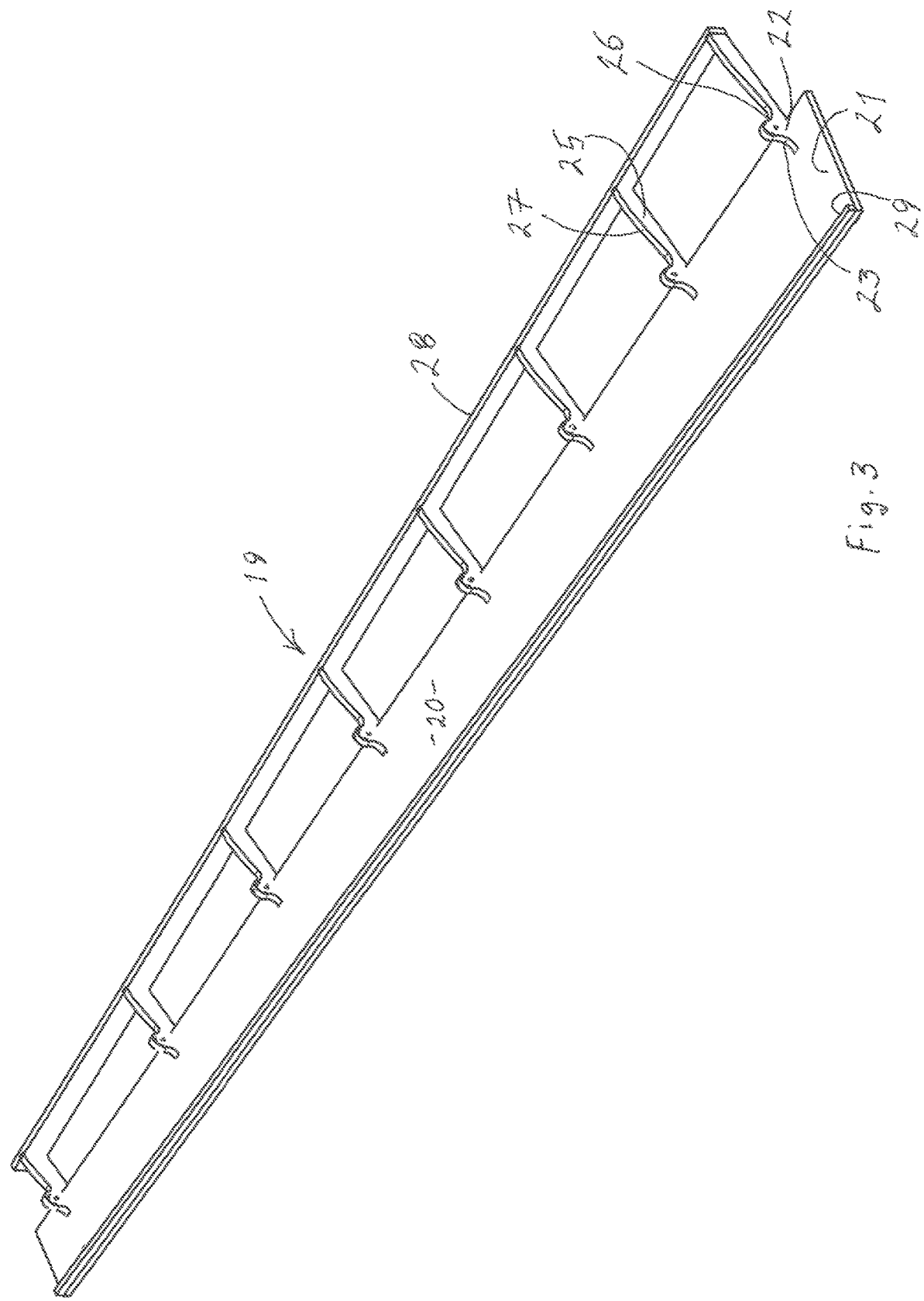
FIG. 3 is a perspective schematic view from above of a jig for use according to the method of the invention, in an open position.

Referring to FIGS. 3, 4 and 5, a forming jig 19 according to the invention is shown. The jig 19 has a bed 20 with a flat forming surface 21. Rigidly attached to the bed 20 is a series of uprights 22. Each upright has a curved cutout 23 and a bolt 24 passing therethrough.

Pivotally attached to each upright 22 by a bolt 24 is a forming arm 25. Each forming arm has a generally circular leading edge cutout 26 and a lower surface forming portion 27. Rigidly linking the forming arms 25 together is a clamping member 28.

Attached to the bed 20 is an edge abutment member 29 to receive the side edge 4 of the part cured composite component 30.

Figure 2:
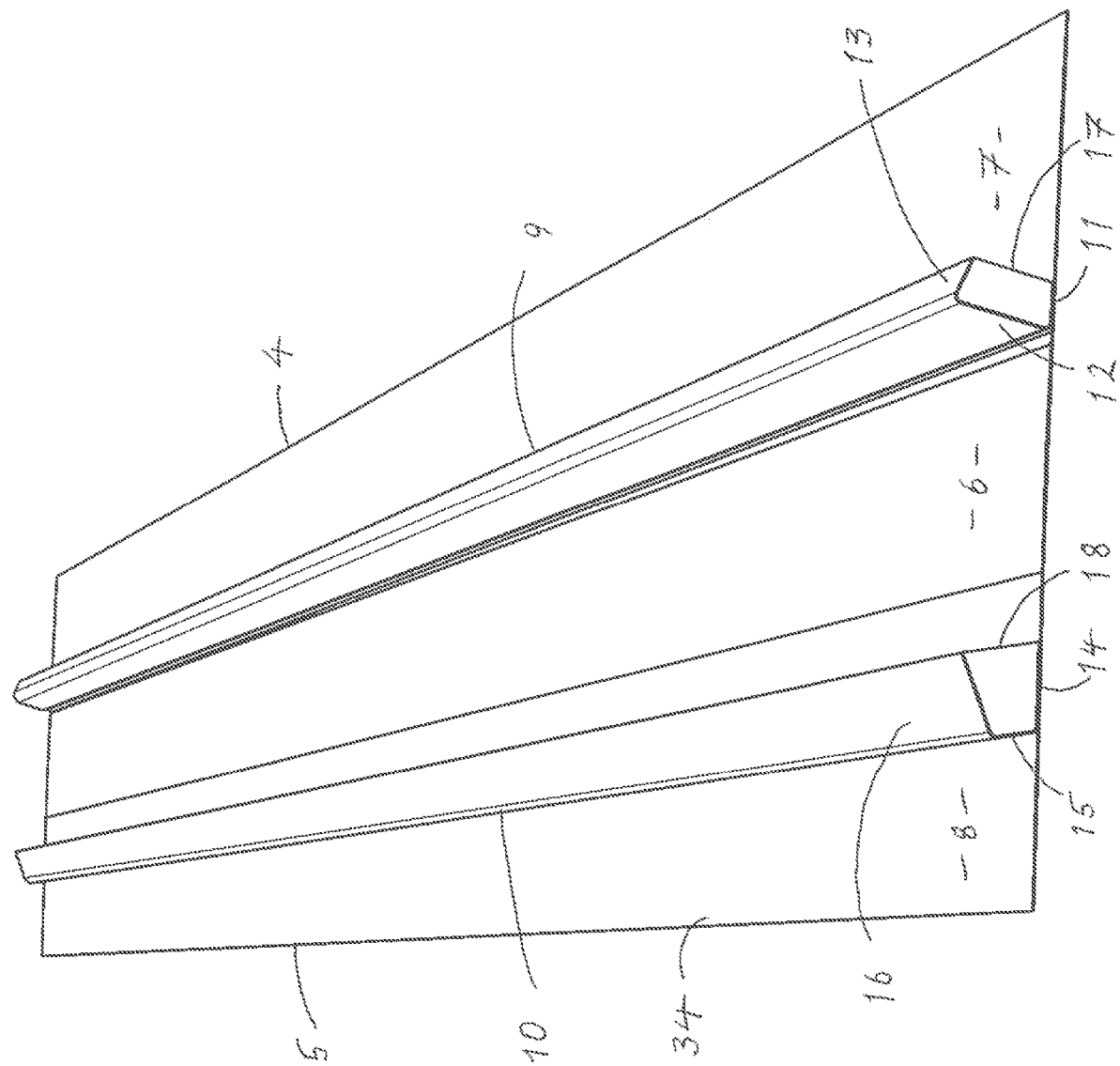
FIG. 2 is a perspective view from one end of a composite component according to the invention.

In use, firstly, film adhesive is applied to third limb 13 of front spar 31, to third limb 16 of rear spar 32 and to edge region 34 (see FIG. 2) on the reverse side of surface region 8. The composite article 30 is heated to its glass transition temperature, to ease bending of the leading edge region 6. Bending can be further encouraged by cutting out slots (not shown) in the leading edge region 6 where the leading edge of the aileron will be attached to an aircraft wing. Then, with the forming arms 25 pivoted to an open position, as shown in FIG. 3, the edge 4 of the part cured composite component 30 is placed against the edge abutment member 29, with spars 31, 32 uppermost. The clamping member 28 is then pivoted to a closed position, as shown in FIG. 4, whereby the composite component 30 is folded about the leading edge region 6 until limbs 13, 16 contact surface regions 8, 7, respectively and edge 5 is pressed into contact with edge 4. A series of clamps 33 is then applied (only one shown), to clamp the clamping member 28 to the forming surface 21, with the composite component 30 sandwiched in between.

With the composite component 30 held in the shape of an aerofoil by the jig 19, full curing of the composite, as required, and the adhesive takes place over 48 hours with a post cure of 5 hours at 70 deg C. Temperatures and times will always be dependent upon the type of resin used.

The finished aileron 35 is then removed from the jig 19. End caps (not shown) may then be applied to the aileron 35 and the trailing edge 36 trimmed to final shape. The end caps and other wing attachment devices may be applied before the folding operation.

Thus it can be seen that the invention provides means of manufacturing an aerofoil without the use of plugs or moulds of any sort and without the use of fasteners. The main structure of the composite component with spars is formed with a single co-curing process. The invention is suitable for high rate, lower cost production with high deposition rates being possible for the flat layup of the aerofoil skin and for the spar or spars. Various conventional assembly jigs are replaced with the single forming jig of the invention. A single trimming operation is all that is required, according to the invention, to trim the aerofoil trailing edge.

The aerofoil according to the invention is also expected to be of reduced weight, compared to those made by conventional construction methods.

If the aerofoil is a movable wing control surface such as an aileron, the top surface may be flat. With the shape of the leading edge region being substantially circular (and shielded in flight by the main wing), only the lower surface may need to be specifically profiled. The bed can be flat and the leading edge forming part of the jig may be made circular.

With the use of the forming jig, according to the invention therefore, only the forming arms may need to be profiled according to specific design data. This can be done, as those skilled in this field will know, by using the aileron design master data at each arm location to provide the appropriate curvature data for that arm. Manufacture of the arms may be simply achieved by overlaying a template printed from design data onto material for construction of the arm and machining or otherwise forming the arm to shape. The use of conventional design drawings is thus avoided, with the invention.

The embodiments described herein are respective non-limiting examples of how the present invention, and aspects of the present invention, may be implemented. Any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined by the accompanying claims.

Where the term "or" has been used in the foregoing description, this term should be understood to mean "and/or", except where explicitly stated otherwise.

The invention claimed is:

1. A method of forming a composite component, wherein the method includes:
   forming a first layup of plies of fiber reinforced plastics composite material into a flat sheet having a middle section and side sections on opposite edges of the middle section, wherein the flat sheet has a length in a spanwise direction of the airfoil and a width in a chordwise direction of the airfoil, and the flat sheet has an outer surface configured to form an aerodynamic surface and an opposing reverse surface,
   forming on the opposing reverse surface of the side sections a second layup of plies to be formed into a spar extending in a spanwise direction of the flat sheet,
   supporting the second layup of plies against the reverse surface, partially curing the first and second layups of plies together to form the composite component;

folding the composite component to form an aerofoil including a leading edge region form, at least in part, by the middle section of the first layup of plies and the aerofoil further including a trailing edge region formed, at least in part, by edges of the side sections, wherein the side sections overlap each other due to the folding, and wherein the folding of the first layup of plies positions the spar forward of the trailing edge region and positions the spar between the side sections such that the spar abuts both side sections, supporting the folded composite component in an aerofoil shape, and applying heat and pressure to fully cure the composite component in the aerofoil shape.

2. The method according to claim 1, in which the steps of folding the composite component and supporting the folded composite component comprise placing the composite component in a forming jig shaped to form the composite component into the aerofoil shape and folding the composite component in the jig about the leading edge region until edges of the first and second surface regions meet.

3. The method according to claim 1, in which the second layup of plies is formed as a second flat sheet before being supported in the shape of the spar against the opposing reverse surface.

4. The method according to claim 1, in which the second layup of plies is formed into a C shape when being supported in the shape of the spar against the opposing reverse surface.

5. A method to form an aerofoil structure comprising:

forming into a sheet a first layup of plies of fiber reinforcing material, wherein the sheet includes an outer surface and an inner surface opposite to the outer surface, and the sheet has a central leading edge section, a first panel section adjacent a first side of the central leading edge section and a second panel section adjacent a second side of the central leading edge section which is opposite to the first panel section, and the central leading edge section and the first and second panel sections each have lengths corresponding to a length of the aerofoil structure;

forming on the inner surface of the first panel section a second layup of plies of fiber reinforcing materials to be formed into a first spar, wherein the second layup of plies is spaced a first distance from a first edge of the sheet;

forming on the inner surface of the second panel section a third layup of plies of fiber reinforcing material to be formed into a second spar, wherein the third layup of plies is spaced a second distance from a second edge of the sheet opposite to the first edge, and the second distance is different than the first distance;

at least partially curing together the first, second and third layups to form a composite component that includes the sheet, the first spar and the second spar;

folding the composite component about the leading edge region until the first edge is proximate to the second edge to form the aerofoil shape, wherein upon the folding the first spar abuts the inner surface of the second panel section and the second spar abuts the inner surface of the first panel section, and applying heat and pressure to the folded composite component to form and cure the folded composite component in the aerofoil shape.

6. The method of claim 5, wherein the sheet is flat.

7. The method of claim 5, wherein the first edge meets the second edge to form a trailing edge of the airfoil shape during the folding step.

8. The method of claim 5, wherein the first spar is parallel to the second spar and the first and second spars extend in a spanwise direction of the aerofoil shape.

* * * * *